Feb. 10, 1970     J. A. GARDNER     3,494,062
FISHING LURE
Filed May 24, 1968
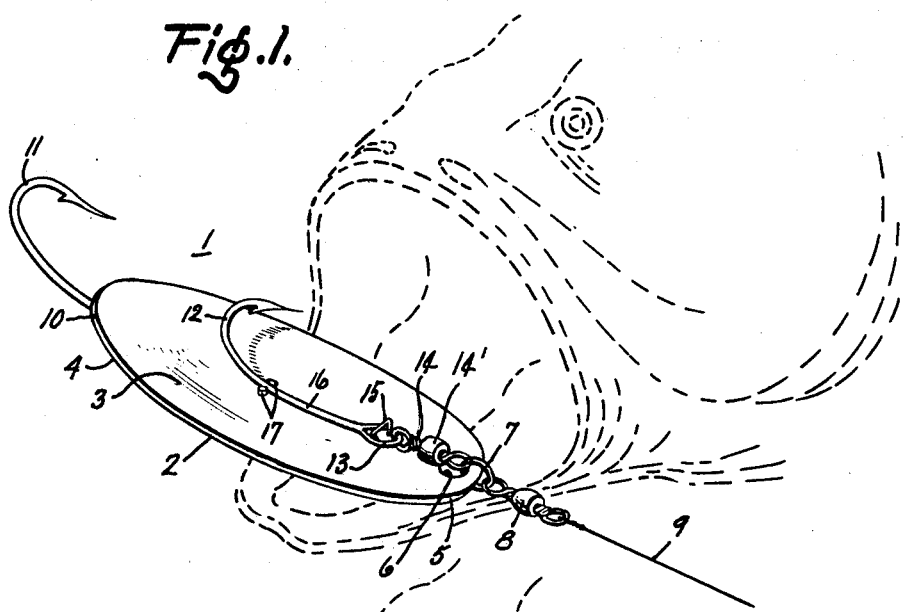
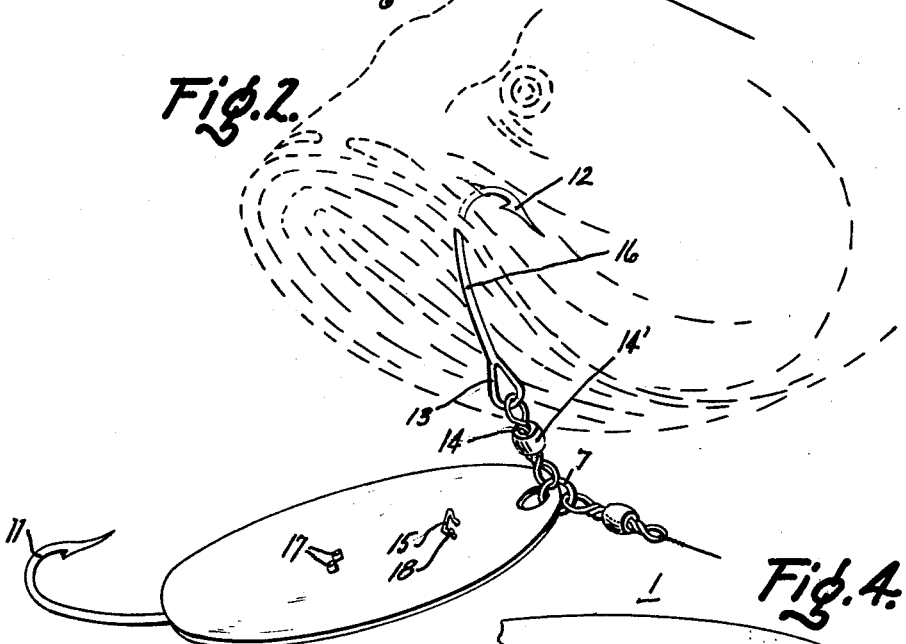
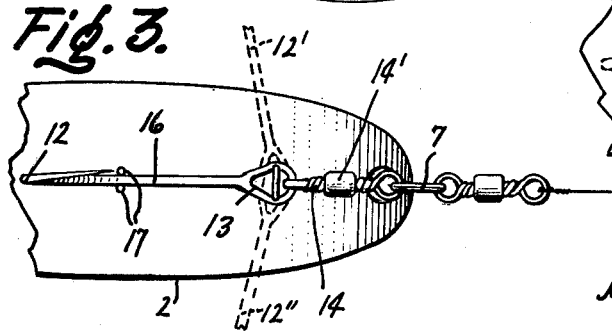
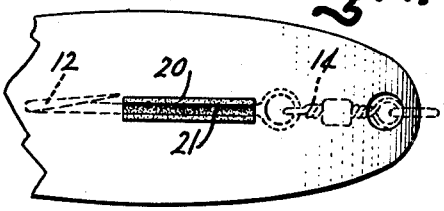
Inventor
John A. Gardner
by Paul G. Frank
His Attorney

United States Patent Office 3,494,062
Patented Feb. 10, 1970

3,494,062
FISHING LURE
John A. Gardner, 827 Thompson St.,
Schenectady, N.Y. 12306
Filed May 24, 1968, Ser. No. 731,925
Int. Cl. A01k 85/02
U.S. Cl. 43—42.04                3 Claims

ABSTRACT OF THE DISCLOSURE

A spoon type lure has a concave surface provided with a U-shaped member and a pair of pins spaced longitudinally therealong. A fishhook is loosely secured to the forward end of the spoon and has an oval eyelet and shank portion releasably cooperating with the U-shaped member and pins respectively. The rearward end of the spoon is provided with a conventional fishhook. In a modification, a magnet on the spoon releasably retains a fishhook thereon.

---

My invention relates to fishing lures and in particular to a fishing lure of the spoon type having a hidden hook.

It has long been known to anglers that when fish seize a moving prey, such as another smaller fish, a frog, or even an artificial lure, they normally do not seize it from the tail or rear end, but rather from the side. Also, a fish does not swallow its prey tail first but customarily, after seizing the other fish or prey, will carry it a distance and reverse its hold on the prey so that it can swallow it head first. Thus, if the prey is a minnow or other small fish, the fish seizes the prey at its midsection, runs with it a distance while pinching it in its mouth, then drops it and picks it up again with the head entering the fish's mouth first.

A problem encountered when using an artificial lure is that the fish which seizes the lure usually grabs it in its body portion and frequently is able to drop the lure rather than be caught by any hooks carried on the lure. It would be desirable, therefore, to have on such an artificial lure an arrangement such that, if the fish seizes the body portion of the lure, it is snared by a hook and is unable to free itself. While many lures of the spoon type and other types do carry single or gang hooks attached to the sides of the lure, in many instances the fish upon seizing such a lure is able to throw such side hook from its mouth without too much effort and thus avoids being caught.

It is an object of my invention to provide a fishing lure which includes a hook which is normally hidden by the body portion of the lure and which is released when seized by a fish to snare the fish.

It is another object of my invention to provide a new and improved fishing lure of the spoon type having a hidden hook which is detachably secured to the body of the spoon.

One of the features of my invention consists in providing a fishing lure of the spoon type with two separate fishhooks, one being attached to the trailing edge of the spoon, and the other being normally held against the concave surface of the spoon so that it is hidden from the spoon's convex surface but being released when the lure is seized by a fish. In one of its embodiments the second hook has an eye portion which engages a retainer on the concave surface and a shank portion which is normally held between a pair of retaining pins.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the drawings are identified by the same character reference and wherein:

FIGURE 1 is a perspective view of the fishing lure of my invention prior to its being seized by a fish.

FIGURE 2 is a perspective view of the same lure after being seized by a fish.

FIGURE 3 is a plan view of the lure of FIGS. 1 and 2 and

FIGURE 4 is a modification of the lure of FIG. 3.

In FIGURE 1 the spoon type lure 1 has a body portion 2 having an inner or concave surface 3 and an outer or convex surface 4. At its leading edge 5 the lure is provided conventionally with a hole 6 having a ring 7 and a swivel 8 to which may be attached a fishing line 9. At the trailing edge 10 of lure 1 there is provided one or more fishhooks 11 in a conventional manner. The fishhook 11 may either be rigidly attached to spoon 2 or may be a single or gang hook attached to spoon 2 by means of a ring or other connector.

In acordance with my invention, I provide a second fishhook 12 having an elliptical or oval shaped eye portion 13 and which is attached to ring 7 by means of a link 14 which may include a conventional swivel 14'. The length or major axis of eye portion 13 is greater than its width or minor axis and extends in the direction of shank 16 of hook 12. Also, in accordance with my invention, when lure 1 is drawn through the water, as in trolling, the second hook 12 is maintained close to the concave surface 3 of spoon 2 and is substantially hidden from the convex surface 4 of spoon 2. To effect this result, I provide a retaining means comprising a first substantially U-shaped metal member 15 which is attached to spoon 2 by riveting, brazing, or the like. Also, the width of U-shaped member 15 is greater than the inner width or minor axis of eye 13. Preferably, member 15 is located close to the leading edge 5 of spoon 2 so that the relatively straight shank portion 16 of hook 2 rests between the second portion of my retaining means which comprises a pair of pins 17 which restrain or resist lateral motion of hook 12. To assist in retaining hook 12 close to the concave surface of spoon 2, metal member 15 has a curved or re-entrant portion in the form of an inward bend 18 in at least one of its vertical legs. The function of portion 18 is best seen in FIGURE 3 which illustrates in dotted lines the manner in which hook 12 is engaged by member 15. In placing hook 12 in position so that it is hidden by the concave surface of spoon 2, since the width of member 15 is greater than the width of the minor axis of oval eye portion 13, the hook is moved to either position 12' or 12" so that the length or major axis of eye portion 13 passes over member 15. Thereafter the hook is rotated to the position shown in which the curved portion 18 engages the walls of the minor axis of eye portion 13 to retain hook 12 in the position indicated. Shank 16 then rests between pins 17 which resist any lateral or sidewise movement of hook 12 that might otherwise occur because of the force of the water on hook 12 as the lure is drawn through the water.

FIGURE 2 illustrates the manner in which hook 12 serves to seize or snare a fish which strikes the lure. In the act of striking, the fish moves the hook 12 sufficiently vertically that it rises above pins 17, moves laterally and is released from member 15. A hook 12 is released from my retaining means the barb of the hook cannot be evaded by the fish.

In the modification of my invention shown in FIGURE 4, member 15 and pins 17 of the lure of FIG. 1 are replaced and the functions of both of these members are performed by an elongated permanent magnet member 20 having a longitudinal channel 21 for receiving the shank of hook 12. Magnet 20 may be of a conventional aluminum-cobalt-nickel type which is secured to spoon 2 by rivets or by means of a conventional epoxy glue. In this modification of my lure, hook 12 fits in the channel or groove 21 in magnet 20. Groove 21 resists lateral movement of hook 12 and the magnetic force of magnet 20 holds the hook close to the concave surface of lure 1. The force of a fish striking the lure is sufficient to dislodge hook 12 from groove 21 and permit the hook to swivel on link 14.

In using the fishing lure, I have found that usually the fish is caught on the second hook either by itself or in addition to the first hook. This substantiates the theory that a fish will strike the body of a moving prey rather than the tail or head in the first instance. Since, in accordance with my invention, hook 12 is hidden from the convex surface of the lure and is held very close to the concave surface, the fish is unable to escape being caught by hook 12 when it seizes the lure as it is trailed through the water. Even though it is able to disgorge spoon 3, it cannot "throw" hook 12. Furthermore, my experience has been that, whereas with prior lures in many instances fish were lost rather than caught, in using my improved lure, to-date ninety-five percent of the fish which have attempted to seize the lure have been successfully hooked.

Having described several embodiments of my new and improved fish lure, it is believed that other modifications and variations are possible in the light of my above teachings. It is therefore to be understood that changes may be made in the particular embodiments of my invention as described which are within the full intended scope of the invention.

What I claim as new and desire to secure by Letters Patent of the United States is:

1. A fishing lure comprising:
a spoon having a concave surface and a convex surface,
first means for connecting the leading edge of said spoon to a fishline,
a first fishhook connected to the trailing edge of said spoon,
a second fishhook connected to said first means having a length shorter than said spoon,
second means for normally retaining said second hook closely adjacent the center of said concave surface in a position such that the point of said second hook is retained approximately midway between the leading and trailing edges of said spoon and is substantially hidden from said convex surface, said second means including means whereby said second hook is released from said hidden position when the spoon is seized by a fish, and means for restraining lateral motion of said hook, said second hook having a shank portion and an oval eye portion and said second means comprising a U-shaped member attached to the concave surface of said spoon and having a width greater than the width of the minor axis of said eye portion.

2. The lure of claim 1 which includes a pair of pins extending from said concave surface for restraining lateral motion of the shank portion of said second hook when it is in its hidden position.

3. The lure of claim 4 in which the U-shaped member has a pair of legs, at least one of said legs having an inward bend.

References Cited

UNITED STATES PATENTS

| | | | |
|---|---|---|---|
| 1,050,759 | 1/1913 | Betts et al. | 43—42.04 |
| 2,738,612 | 3/1956 | French | 43—42.52 X |
| 2,871,608 | 2/1959 | Fisher | 43—35 |
| 3,246,416 | 4/1966 | Alimas | 43—42.52 |

WARNER H. CAMP, Primary Examiner

U.S. Cl. X.R.

43—42.5